May 23, 1961 V. L. HELGESON ET AL 2,985,365
SOLUTION POSSIBLE INDICATOR FOR BOMBING COMPUTER
Filed July 16, 1956 3 Sheets-Sheet 1

INVENTORS
Edward J. Lopez &
BY Virgil L. Helgeson
E.W. Christen
ATTORNEY

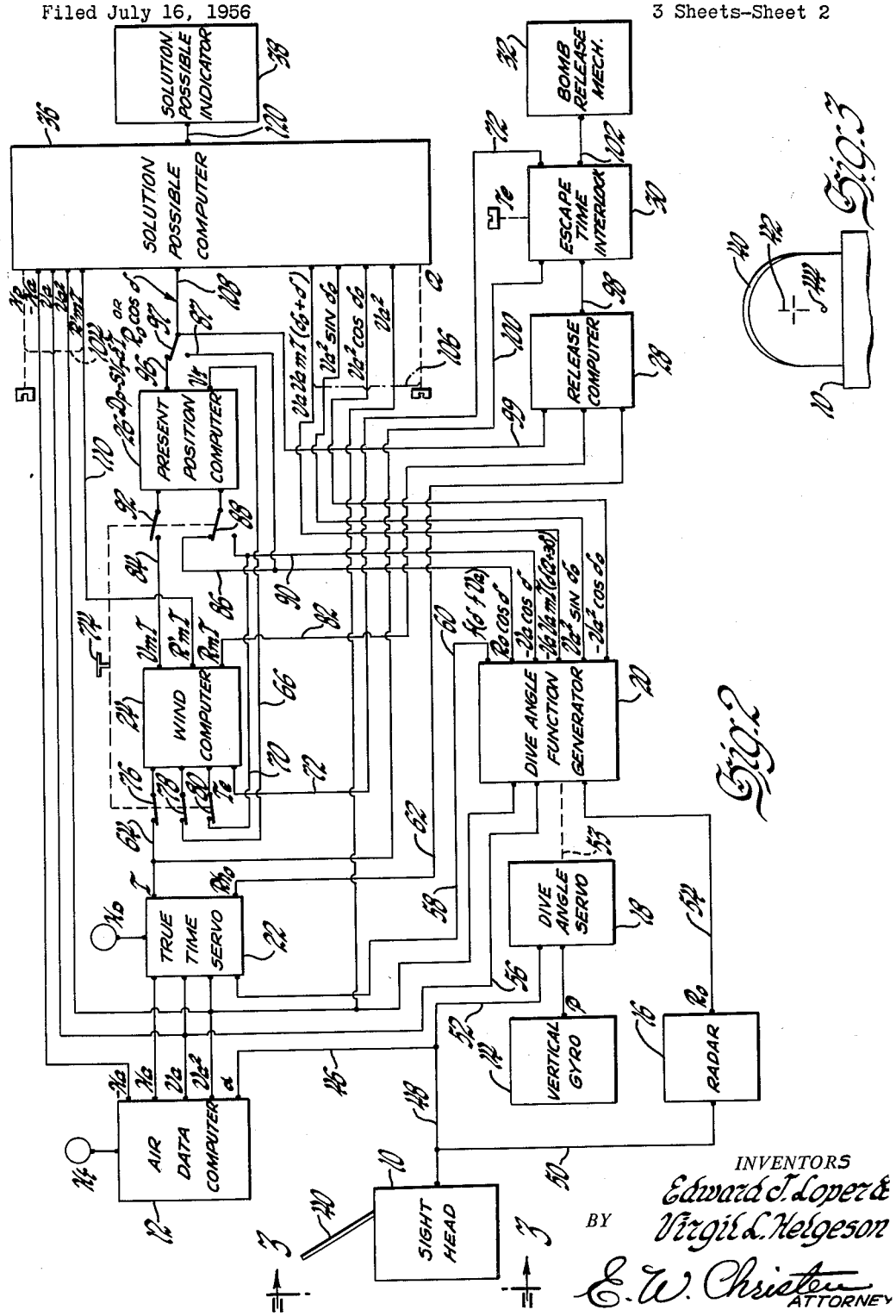

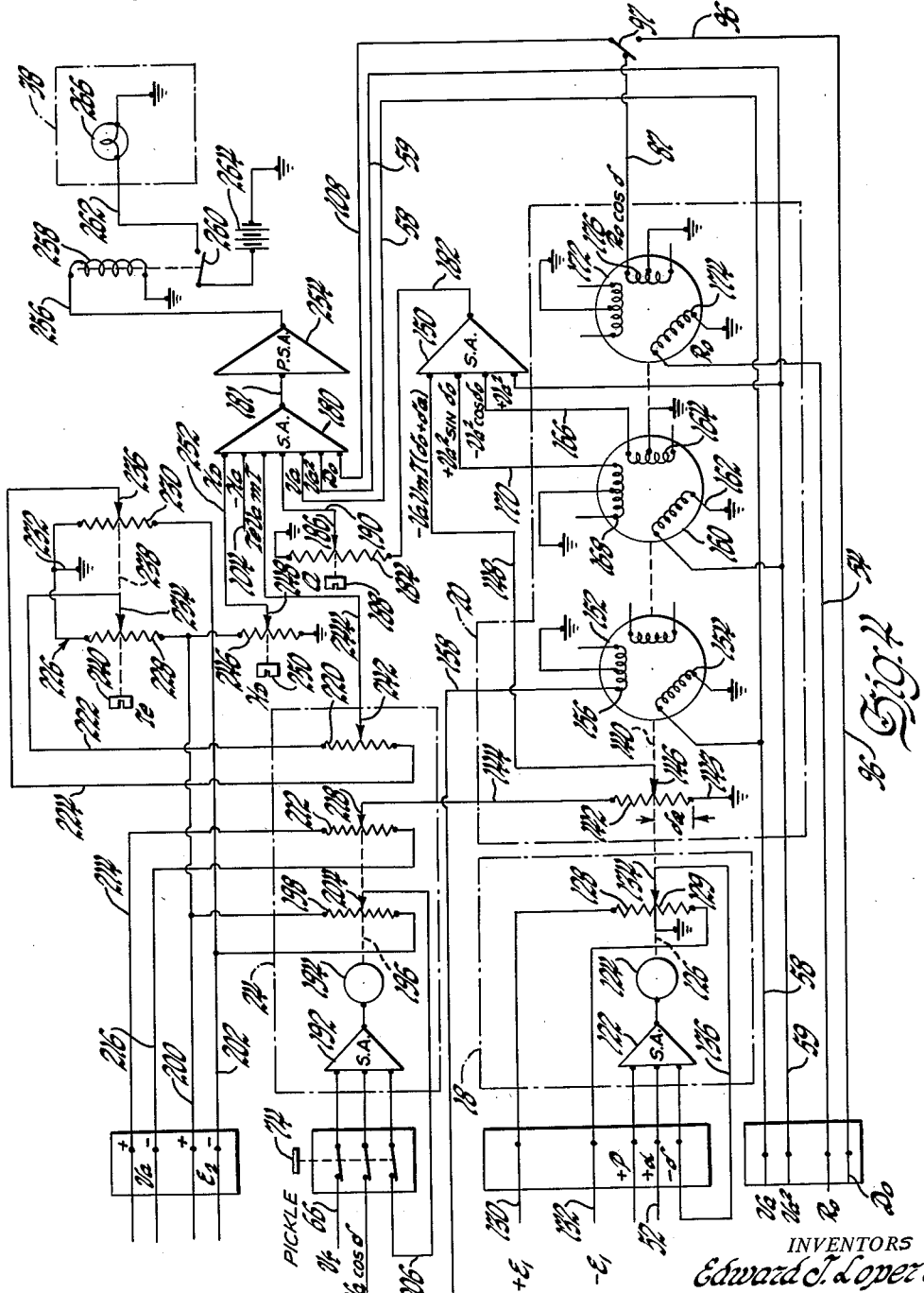

United States Patent Office 2,985,365
Patented May 23, 1961

2,985,365

SOLUTION POSSIBLE INDICATOR FOR BOMBING COMPUTER

Virgil L. Helgeson and Edward J. Loper, Milwaukee, Wis., assignors to General Motors Corporation, Detroit, Mich., a corporation of Delaware Filed July 16, 1956, Ser. No. 598,033

13 Claims. (Cl. 235—61.5)

This invention relates to bombing computer systems and more particularly to such systems adapted for toss bombing.

In toss bombing the aircraft is flown initially along a course which lies in a vertical plane containing the selected target. At some point along this course in the approach toward the target a pull-up maneuver is initiated and the bomb is released along the pull-up course. In the dive mode of toss bombing the aircraft is flown along a collision course or straight line course which intersects the target. In the level mode of toss bombing the aircraft is flown along a horizontal course which lies in a vertical plane containing the target.

Toss bombing computer systems are known which respond to continuously derived data signals which are functionally related to develop a bomb release signal at a point where the aircraft path is tangent to a bomb trajectory intersecting the selected target. In one type of toss bombing computer, horizontal and vertical distance equations, which relate the predicted bomb trajectory and the aircraft and target positions, are continuously evaluated to ascertain the bomb release point. This system permits the flight path of the aircraft to be modified in any desired manner after an initial or acquisition phase so long as it is confined to the vertical plane through the aircraft and target at the initiating point. Such a system is disclosed and claimed in the copending U.S. application Serial No. 598,034 for "Bombing Navigational Computer," filed on even date herewith by Virgil L. Helgeson and Edward J. Loper and assigned to the assignee of the present invention.

In toss bombing, regardless of the mode or the particular computer system employed, it is desirable to determine the first point in the approach to the target that a pull-up maneuver may be initiated which will result in a valid solution to the bombing problem. Premature pull-up is likely to result in an abortion of the solution and failure of the bombing mission. On the other hand, late pull-up is often undesirable for tactical and other reasons. It is therefore desirable to provide a signal to the pilot which apprises him, at the first instant in the bombing run, that a solution to the bombing problem has become possible. This permits a timely pull-up maneuver to be executed. As a result, accuracy and effectiveness of bomb delivery is greatly enhanced, the pilot is relieved of the burden of judging the correct pull-up point, and unnecessarily close approach to the target is avoided.

Accordingly, it is an object of this invention to provide means for ascertaining the first point on a bombing path at which a pull-up maneuver may be initiated to obtain a solution to the bombing problem.

An additional object is to provide a solution possible computer for a bombing computer system which determines the first permissible pull-up point on the bombing path on the basis of a predetermined pull-up maneuver.

An additional object is to provide a solution possible computer combined with a bomb release computer of the type which continuously evaluates horizontal and vertical distance equations relating a predicted bomb trajectory to the aircraft and target positions.

A further object is to provide a solution possible indicator which continuously evaluates horizontal and vertical distance equations to ascertain the point at which the predicted horizontal pull-up distance plus the predicted horizontal trajectory is equal to or greater than the distance from the aircraft to the target.

An additional object of this invention is to provide a toss bombing system in which the data signals employed in the release computer are modified in accordance with selected parameters of a predetermined pull-up maneuver and utilized in the solution possible computer.

In accordance with this invention a solution possible computer is provided which develops a pull-up prediction signal quantity and a bomb trajectory prediction signal quantity which define a predicted bomb release point. The computer also develops a distance to target signal quantity. The distance to target signal quantity is modified in accordance with the pull-up prediction quantity and the sum is compared with the predicted trajectory signal quantity to develop a resultant signal. When the predicted trajectory signal quantity is equal to or less than the summation as signified by the resultant signal, the solution possible maneuver may be initiated to obtain a solution to the bombing problem. The pull-up maneuver will cause an associated release computer to develop distance to target and trajectory quantities which are combined to effect bomb release at or beyond the predicted release point to impart a trajectory to the bomb which intersects the target.

A more complete understanding of the invention may be had from the detailed description which follows taken with the accompanying drawings in which:

Figure 2 is a block diagram of the toss bombing computer system.

Figure 3 is a view of a detail taken on line 3—3 of Figure 2.

Figure 4 is a schematic diagram illustrating the solution possible computer system in greater detail.

Figure 1:
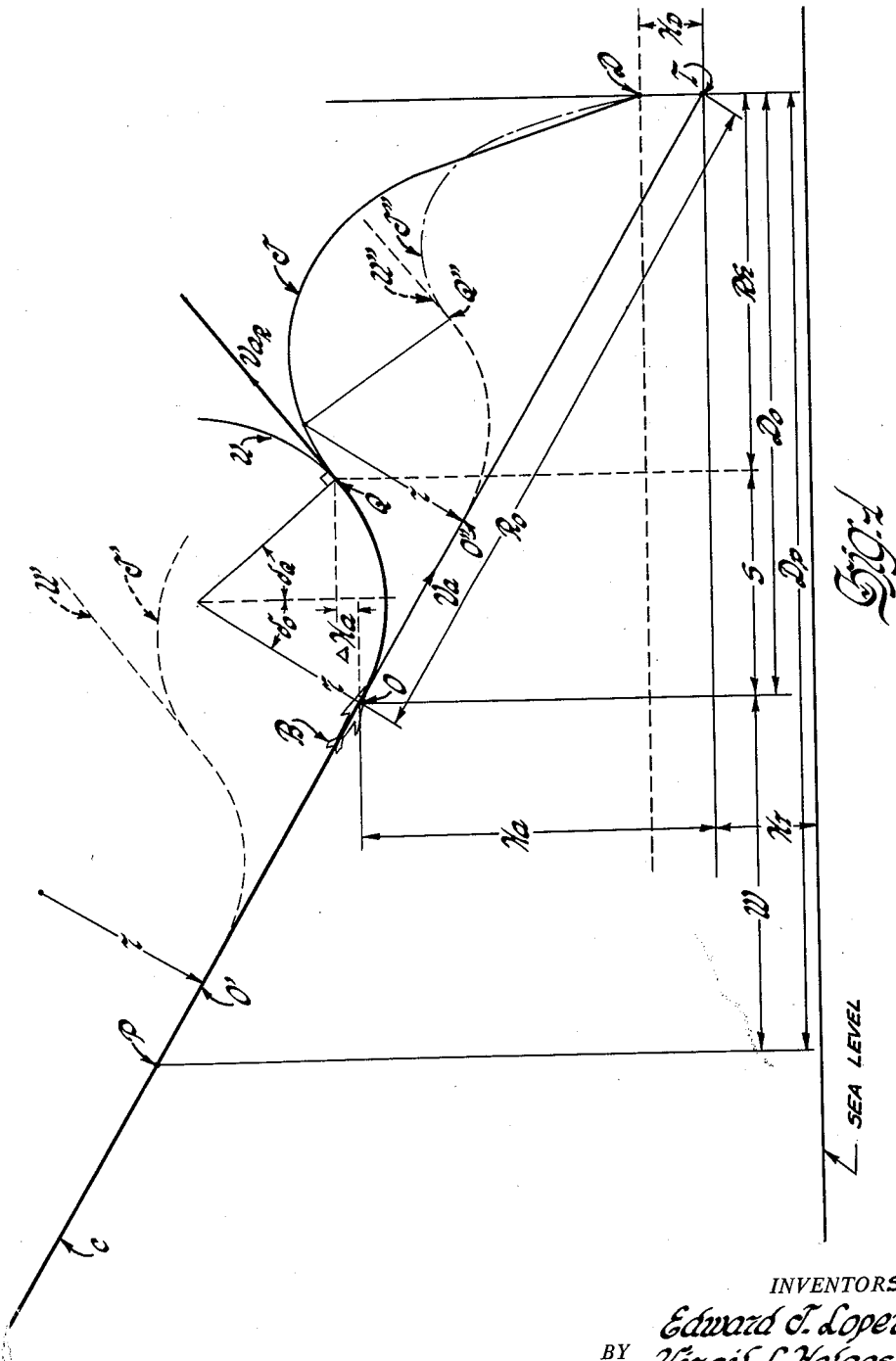
Figure 1 represents the geometry involved in solution possible prediction for a typical toss bombing operation.

Referring now to the drawings, there is shown an illustrative embodiment of the invention in a solution possible computer system combined with a bomb release computer system especially adapted for toss bombing. Before proceeding with a description of the instrumentation of the computer system it will be helpful to consider the geometry and formulation of the solution possible problem.

In Figure 1 there is illustrated the geometry of a typical dive mode toss bombing problem. The bombing aircraft B in a dive toss operation, approaches the selected target T along a suitable collision course C. The target T is known to be at an altitude $H_T$ above sea level and it is desired to cause bomb burst at the detonation point D which is at an elevation $H_D$ vertically above the selected target T. The collision course C is a straight line disposed in a vertical plane intersecting the selected target and is established by the pilot in the initial or acquisition phase of the bombing run with the aid of a suitable sight. When the tracking of the target in the acquisition phase is satisfactory, a manual switch is actuated at the initiating or "pickle" point P to initiate the operation of certain components of the bombing computer system. The initiating point P is at a horizontal distance $D_p$ from the selected target T.

After the initiating point P in the bombing run, the aircraft may be maneuvered in any desired fashion so long as its course remains in the vertical plane containing the initiating point and the target, and a solution to the bombing problem will be realized at some point in the approach to the target. In the typical dive toss bombing situation illustrated, the collision course C is maintained beyond the initiating point. In this case a solution to the bombing problem will occur during a pull-up maneuver. If the pull-up maneuver is to be executed with an acceleration greater than some specified value, the pull-up must not be initiated prematurely on the collision course or a solution to the bombing problem would not obtain during pull-up. For example, a pull-up maneuver at a given value of acceleration, A, initiated at the point O' follows a pull-up course U' which approximates a circular arc having a radius of curvature $r$. This pull-up is premature and release of the bomb anywhere on the pull-up course U', even at the point for maximum toss, would produce a bomb trajectory J' which falls short of the target.

If the approach to the target T is continued along the collision course C and a pull-up maneuver at an acceleration A is initiated at point O, the pull-up course U, having a radius of curvature $r$, will result. Release of the bomb during this pull-up course U at a release point Q imparts maximum toss to the bomb in the bomb trajectory J which intersects the selected target. Accordingly, the point O is this first point in the bombing run at which the pull-up may be initiated to obtain a successful solution to the bombing problem. If the collision course C is continued, a successful solution to the bombing problem may be obtained by executing the pull-up maneuver at any point beyond the pull-up point O. For example, pull-up initiated at point O" results in pull-up course U". The release point Q" is such that the trajectory J" imparted to the bomb intersects the target. It remains, therefore, to ascertain the first point O on the selected approach course at which initiation of a pull-up maneuver, which will not exceed a specified maximum value of acceleration, will result in a pull-up path which is tangent to a bomb trajectory intersecting the selected target.

Consider now the aircraft B to have a present position at the pull-up point O and to approach the target T with a velocity $V_a$. The aircraft is at an altitude $H_a$ above the level of the selected target T and at a horizontal distance $D_o$ and slant range $R_o$ from the target. The aircraft is a horizontal distance W from the initiation point P.

The release point Q corresponding to a release angle which imparts maximum toss to the bomb is a horizontal distance S from the pull-up point O. The horizontal component of the bomb trajectory J in ground coordinates from the release point Q to the detonation point D is designated $R_h$.

From inspection of the geometry of Figure 1, the following relationship is apparent:

$$D_p - W - S - R_h = 0 \quad (1)$$

where $D_p$ = the horizontal distance from the initiating point P to the target.
$W$ = the horizontal distance traversed by the aircraft from the initiating point to the present position.
$S$ = the horizontal distance from the present aircraft position to the release point.
$R_h$ = the horizontal distance in ground coordinates the bomb travels from the release point to the detonation point.

When the aircraft is at release point Q the distance S is zero and the conditions for intersection of the desired detonation point by the bomb trajectory are defined by the general release equation $$D_p - W - R_h = 0 \quad (2)$$

When this equation is satisfied the horizontal distance of the aircraft from the target is equal to the horizontal distance the bomb will travel from the aircraft to the detonation point and accordingly a successful solution to the bombing problem is achieved.

The present position of the aircraft with respect to the target is given by $$D_o = D_p - W \quad (3)$$

In accordance with the general release Equation 2 a solution is realized only when the present position of the aircraft with respect to the target is equal to the horizontal component of the bomb trajectory or $$D_o = R_h \quad (4)$$

However, the present position of the aircraft with respect to the target must be altered by the distance S, the distance from the present position O to the release point Q in order to be equal to the horizontal trajectory of the bomb $R_h$. This relationship is expressed as follows:

$$D_o - S = R_h \quad (5)$$

If the value of S is established at a minimum by arbitrarily assigned limits and the value of $R_h$ corresponding to this condition is taken at its maximum value, then $D_o$ is the maximum value which will result in a successful solution. However, any lesser value of $D_o$ will also result in a successful solution because $R_h$ is variable in accordance with conditions of bomb release. Accordingly, the general expression for solution possible is given as follows:

$$D_o - S - R_h \leq 0 \quad (6)$$

In order to provide for automatic solution of Equation 6 it is necessary to express the terms in a form which may be mechanized. The first term $D_o$ of the solution possible Equation 6 represents the distance from the present position to the target and may be obtained by any suitable form of distance measuring equipment. Suitable expressions for the terms S and $R_h$ will be derived presently.

The term S of the solution possible expression which represents the horizontal pull-up distance from the present position or the aircraft to a bomb release point may be expressed as follows:

$$S = \int_0^Q V_{Th} dt = \int_0^Q V_{ah} dt + \int_0^Q V_{mT} dt \quad (7)$$

where $V_{Th}$ = the velocity of the aircraft relative to the target in the horizontal direction.
$V_{mT}$ = the velocity of the air mass relative to the target in the vertical plane.
$t$ = time.
$V_{ah}$ = the velocity of the aircraft relative to the air mass in the horizontal direction.

The distance S is a predicted distance and its value is a function of numerous variables. Satisfactory accuracy for the purpose at hand may be realized by expressing the distance S in terms of the variable quantities and evaluating the expression on the basis of the value of the variables at the present position of the aircraft. If desired, the accuracy may be enhanced by modifying the present value of the variables in accordance with expected changes from the present position values.

In the evaluation of the integrals of Equation 7 it will be assumed, to simplify the analysis, that the velocity of the air mass relative to the target and the velocity of the aircraft relative to the air mass are constant throughout the bombing run. It will also be assumed that the pull-up maneuver is executed at a constant value of acceleration not including the one G (unit of gravity) due to the earth's gravity. In the evaluation of the integrals the time interval required from the pull-up point O to the release point Q may be derived from the fundamental relation of angular velocity and displacement.

$$t = \theta/w \quad (8)$$

The angular velocity may be expressed as $$w = V_a/r = A/V_a \tag{9}$$

where angular the displacement is $$\theta = \delta_Q - \delta_O \tag{10}$$

Substituting (9) and (10) in Equation 8 yields $$t = \frac{K_0 V_a}{A}(\delta_Q - \delta_O) \tag{11}$$

where $A$=the maximum value of acceleration incurred in the pull-up maneuver.
$V_a$=velocity of aircraft relative to the air mass.
$\delta_O$=the dive angle of the aircraft at the point O.
$\delta_Q$=the dive angle of the aircraft at the point Q.
$K_0$=a constant factor for converting degrees to radians.

The evaluation of the integral expressing the distance the aircraft traverses from the pull-up point O to the release point Q due to the relative motion of the aircraft and the air mass depends upon the value of the horizontal component of the velocity vector $$V_{ah} = V_a \cos \delta \tag{12}$$

The instantaneous value of the dive angle is $$\delta = \delta_Q + wt = \delta_O + \frac{At}{V_a} \tag{13}$$

Integration of Equation 12 from pull-up to release expresses the horizontal distance in the air mass $$\int_O^Q V_{ah} dt = \int_O^Q V_a \cos\left(\delta_O + \frac{At}{V_a}\right) dt \tag{14}$$

Evaluation of this integral yields $$V_{ah} dt = \frac{V_a^2}{A}(\sin \delta_Q - \sin \delta_O) \tag{15}$$

Additional accuracy may be obtained by accounting for the relative motion between the air mass and the target. The distance the aircraft moves from the pull-up point O to the release point Q due to the relative motion between the air mass and the target may be expressed by substituting Equation 11 into the second term of Equation 7 to obtain $$\int_O^Q V_{mT} dt = \frac{K_0 V_a V_{mT}}{A}(\delta_Q - \delta_O) \tag{16}$$

Therefore, the predicted pull-up distance from the pull-up point O to the release point Q may be expressed as the summation of Equations 15 and 16

$$S = \frac{1}{A}[V_a^2 (\sin \delta_Q - \sin \delta_O) + K_0 V_a V_{mT}(\delta_Q - \delta_O)] \tag{17}$$

In evaluating the Equation 17 the instantaneous value $V_a V_{mT}$, and $\delta_O$ may be measured directly or indirectly and the value of A is arbitrarily assigned. However, the dive angle $\delta_Q$ does not exist as a physical reality and its value must be established by considerations upon which the solution possible equation is premised. Since the first occurrence of solution possible exists for a minimum pull-up distance S when the horizontal trajectory is maximum, the dive angle at the release point Q, or the release angle $\delta_Q$, must be that which imparts the maximum toss to the bomb. Therefore, the release angle $\delta_Q$ is a function of the instantaneous value of velocity and altitude. However, a constant value of release angle may be used if the variation introduced by assuming a constant release angle is accounted for in calibration. The manner of accomplishing this will be described after completing the formulation of the solution possible problem.

The term $R_h$ of the solution possible Equation 6 corresponds to the horizontal trajectory of the bomb and must be expressed in terms of parameters of the system which may be instrumented. The horizontal trajectory of the bomb may be considered as being made up of two components, namely, (1) the bomb trajectory in air mass coordinates (ballistics considered) and (2) the air mass motion relative to the target. Accordingly, the horizontal trajectory $R_h$ may be expressed as $$R_h = R_{ho} + R_{mT} \tag{18}$$

where $R_{ho}$=the horizontal component of the bomb trajectory from the release point to the detonation altitude in air mass coordinates.
$R_{mT}$=the horizontal component of the bomb trajectory from the release point to the detonation altitude due to the relative motion of the air mass and target.

The term $R_{ho}$, the horizontal trajectory in air mass coordinates, may be considered as having two components, namely, (1) the horizontal trajectory at the pull-up point O for the condition in which the aircraft velocity vector is oriented for maximum toss and (2) the change in horizontal trajectory resulting from the difference in altitude between the release point Q and the pull-up point O. This may be expressed as $$R_{ho} = R'_{ho} + \Delta R_{ho} \tag{19}$$

It is known that the maximum trajectory at the pull-up point O is a function of altitude and velocity. An analysis of this function shows that one expression which provides the required accuracy is as follows $$R'_{ho} = K_1 H_f + K_2 V_a^2 + K_3 V_a + K_4 \tag{20}$$

where $H_f = H_a - H_D$ = height of aircraft above detonation point.

$$R'_{ho} = K_1(H_a - H_D) + K_2 V_a^2 + K_3 V_a + K_4 \tag{21}$$

Additional refinement of the predicted trajectory is obtained by considering the difference in altitude of the pull-up point and the predicted release point. From the Expression 21 it may be seen that change in horizontal trajectory resulting from a change of altitude is a linear function of altitude. Accordingly, $$\Delta R_{ho} = K_1 \Delta H_a \tag{22}$$

The change in altitude is given by $$\Delta H_a = \int_O^Q V_a \sin\left(\delta_O + \frac{At}{V_a}\right) dt \tag{23}$$

Substitution of Equation 23 into Equation 22 and evaluation of the integral yields $$\Delta R_{ho} = K_1 \frac{V_a^2}{A}(\cos \delta_O - \cos \delta_Q) \tag{24}$$

The horizontal trajectory in air mass coordinates may now be rewritten by substituting Equations 21 and 24 into Equation 19 which yields $$R_{ho} = K_1\left[H_a - H_D + \frac{V_a^2}{A}(\cos \delta_O - \cos \delta_Q)\right] + K_2 V_a^2 + K_3 V_a + K_4 \tag{25}$$

Also the accuracy of the predicted trajectory is enhanced by considering the effect of range wind. In order to evaluate the term $R_{mT}$ of Equation 18, the relative velocity of the air mass and target must be integrated over the time from the bomb release to the detonation altitude. This elapsed time, designated T, is $T$=the true time or fall of the bomb from the release point Q to the detonation point D.

This value of time may be approximated in numerous manners in accordance with the degree of accuracy desired. It may be obtained by the use of a complex function of altitude at the expense of additional computer components or as a function of altitude and velocity similar to that employed for $R'_{ho}$ in Equation 20. It is convenient, however, to use the escape time as an approximation to the time of fall. Therefore, the horizontal component of the trajectory due to the relative velocity of the air mass and target is given by $$R_{mT} = V_{mT} T_e \qquad (26)$$

where $T_e$ = the minimum time of fall of the bomb from release to the detonation point as prescribed by bomb yield and aircraft performance to permit escape.

The horizontal component of the bomb trajectory may be expressed by substituting Equations 25 and 26 into Equation 18

$$R_h = K_1\left[H_a - H_D + \frac{V_a^2}{A}(\cos \delta_O - \cos \delta_Q)\right] + K_2 V_a^2 + K_3 V_a + K_4 + K_5 V_{mT} T_e \qquad (27)$$

The general form of the solution possible Equation 6 may be rewritten by combining Equations 17 and 27 as follows $$D_O - \frac{1}{A}[V_a^2(\sin \delta_Q - \sin \delta_O) + K_0 V_a V_{mT}(\delta_Q - \delta_O)]$$

$$- K_1\left[H_a - H_D + \frac{V_a^2}{A}(\cos \delta_O - \cos \delta_Q)\right]$$

$$+ K_2 V_a^2 + K_3 V_a + K_4 + K_5 V_{mT} T_e \leq 0 \qquad (28)$$

The foregoing Equation 28 may be mechanized for automatic solution in a variety of forms. In the exemplary embodiment it is preferred to assign a constant value to the dive angle at release, or the release angle $\delta_Q$, and mechanize the resultant form of the equation.

This expression may be somewhat simplified by assigning the desired value of release angle $\delta_Q$ and combining terms. In the exemplary embodiment the release angle is chosen to be $$\delta_Q = 30° \text{ climb}$$

As previously described, the constant angle may be used by determining the difference introduced by this value and inserting the difference and determining the constants $K_1$, $K_2$, $K_3$, and $K_4$. The general equation for solution possible takes the form $$D_O + \frac{1}{A}[V_a^2 \sin \delta_O - K_1 V_a^2 \cos \delta_O + (0.866K_1 - 0.5)V_a^2$$

$$- K_0 V_a V_{mT}(\delta_O + 30°) - K_1 H_a + K_1 H_D - K_2 V_a^2$$

$$- K_3 V_a - K_4 - K_5 T_e V_{mT} \leq 0 \qquad (29)$$

This equation is mechanized in order to develop a signal at the first instant on the bombing run that a pull-up maneuver may be initiated to obtain a solution to the bombing problem.

The computer system for mechanization of the solution possible equation to provide a pull-up signal upon satisfaction of the equation is illustrated in Figures 2, 3, and 4. In general, the system comprises a sight 10 for tracking of the selected target and certain data signal sensing devices including the air data computer 12, the vertical reference 14, and the radar system 16. Signal modifying means are provided which include the dive angle servo 18 and the dive angle function generator 20. The function generator 20 supplies signal voltages to the true time servo 22, the wind computer 24, and the present position computer 26 each of which supplies a signal to the release computer 28. The release computer combines the input signals and upon the occurrence of a predetermined resultant, develops an actuating voltage which is applied through the escape time interlock 30 to the release mechanism 32. Modified signals are applied to the solution possible computer 36 which responds to a predetermined set of conditions to energize the solution possible indicator 38.

The sight 10 is of any suitable type adapted to facilitate accurate tracking of a selected target by the pilot of the aircraft. It is desirably of the type which includes a combining glass 40 upon which is projected a fixed reticle 42 and a movable pipper 44. The movable pipper 44, having a reference position corresponding to the zero life line of the aircraft, is adjustably positioned in elevation by a servo driven optical projection system in accordance with the attack angle of the aircraft. The position of the pipper then corresponds to the velocity vector of the aircraft. Therefore, the pilot achieves accurate tracking of the target by adjusting the attitude of the craft so that the movable pipper 44 is centered on the target.

In order to develop data signal voltages which represent the system variables a group of data sensing and converting instruments is provided. The air data computer 12 is a converter system responsive to selected air pressures to develop signal voltages corresponding to certain parameters of the aircraft position and motion. The air data computer may be of a type furnished by Servomechanisms Inc. currently available as Model No. AXC-129. The computer 12 includes a manually adjustable input member designated $H_T$ for introducing information relative to the height of the selected target above the sea level. The computer develops output signal voltages corresponding to the height above the target $H_a$, the true air speed $V_a$ the square of the true air speed $V_a^2$, and the attack angle $\alpha$ of the aircraft. The attack angle signal voltage is applied by a conductor 46 and conductor 48 to the sight 10. The attack angle signal voltage is also supplied through conductor 50 to the radar system 16 to permit accurate tracking of the target by the radar antenna to develop the signal voltage $R_o$ representative of the slant range from aircraft to target. The vertical reference 14 is suitably a conventional vertical gyroscope pick-off which develops a signal voltage output corresponding to the pitch angle, $p$, of the aircraft. The various data signal voltages are utilized in the computer stages in a manner to be described presently.

The dive angle servo 18 is a closed loop servomechanism which responds to the algebraic sum of pitch and attack angle voltages $p$ and $\alpha$ respectively, to angularly position a mechanical output shaft 52 in accordance with the instantaneous dive angle, $\delta$, of the aircraft. The shaft 19 is drivingly connected with the dive angle function generator 20. The dive angle function generator 20 comprises plural resolvers and potentiometers to generate the desired mathematical functions of the input signal voltages. The dive angle function generator is provided with a slant range input signal voltage $R_o$ on conductor 54 from the radar system 16. It is also supplied with true airspeed input signal voltages $V_a$ and $V_a^2$ from the air data computer on conductors 56 and 58, respectively. The dive angle servo 18 and function generator 20 will be described in greater detail subsequently with respect to Figure 4.

A group of output signal voltages developed in function generator 20, designated by the notation $f(\delta)$ $f(V_a)$, represent selected functions of the aircraft dive angle and true airspeed. The specific functions involved are not important to the present invention and the notation is employed in the interest of clarity. This group of signal voltages is applied, as indicated, by conductor 60 to the true time servo 22.

The true time servo 22 is an implicit computer which solves an empirical relationship for evaluating the true time of fall, $T$, of the bomb and the horizontal distance, $R_{ho}$, in air mass coordinates, that the bomb will travel during its fall. The input signal voltages to the true time servo include, in addition to the functions $f(\delta)$ $f(V_a)$, the aircraft elevation signal voltage $H_a$ and the aircraft velocity signal voltages $V_a$ and $V_a^2$ from the air data computer. An additional input to the true time servo is the bomb detonation elevation which may be established by adjustment of the manual control device designated $H_D$. The true time servo solves the following empirical equations:

$$H_f = AT^2 + BT + C \qquad (30)$$

$$R_{ho} = DT^2 + ET + F \qquad (31)$$

and the coefficients A, B, C, D, E, and F are of the form $$A = a_0 + a_1 \sin \delta + a_2 \cos \delta + a_3 F + A_4 V \sin \delta + A_5 V \cos \delta + A_6 V^2 + A_7 V^2 \sin \delta + A V^2 \cos \delta$$

The evaluation of these expressions yields a value for $R_{ho}$ which represents the horizontal distance in air mass coordinates that the bomb will travel during its fall. This quantity is represented by a signal voltage on the conductor 62 which is connected to the input of the release computer 28.

The wind computer 24 is adapted to develop a range wind signal voltage, $V_{mT}$, which corresponds to the velocity of the air mass relative to the target. The wind computer, which will be described in greater detail subsequently, is essentially a closed loop servomechanism which is responsive to the algebraic sum of the horizontal component of aircraft velocity relative to the target and the horizontal component of aircraft velocity relative to the air mass. The instantaneous velocity of the air mass relative to the target is derived by solution of the equation:

$$V_{mT} = V_T - V_a \cos \delta \qquad (32)$$

The input signal voltage $V_T$ to the wind computer corresponding to the velocity of the aircraft relative to the target is supplied from the output of the present position computer 26 by the conductor 66 and the signal voltage, $V_a \cos \delta$, corresponding to the velocity relative to the air mass is supplied from the dive angle function generator by conductors 90 and 70. Additionally, the wind computer is effective to develop a signal voltage $$R_{mT} = V_{mT} T \qquad (33)$$

corresponding to the horizontal distance the bomb will travel due to the range wind. Also, a signal voltage $$R_{mT}' = V_{mT} T_e$$

is developed corresponding to the predicted distance the bomb will travel due to the range wind. For this purpose, the wind computer receives the true time of fall signal voltage T from the true time servo 22 on conductor 64 and the escape time signal voltage $T_e$ from the escape time interlock 30 on the conductor 72. A manually actuated initiating switch 74 is provided with switch contacts 76, 78, and 80 to permit interruption of the input circuits 64, 66, and 70, respectively, at the initiating point P in the bombing run. Accordingly, the value of the air mass velocity relative to the target at the initiating point is memorized in the wind computer for use in the subsequent computer stages during the bombing run. The output signal voltage $R_{mT}$ from the wind computer is applied through conductor 82 to the release computer 28. The sum of the signal voltages $R_{ho}$ and $R_{mT}$, applied to the release computer, correspond to the term $$R_h = R_{ho} + R_{mT} \qquad (18)$$

of the release equation.

The present position computer 26 is adapted to develop a signal voltage corresponding to the instantaneous horizontal distance from the aircraft to the target. Prior to the initiating point P the present position computer is operated as a servo repeater. At the initiating point P the horizontal distance to target is memorized and the computer operation is changed to that of an integrator. Therefore, prior to the initiating point, the input signal voltage of the present position computer is the horizontal range signal voltage $R_o \cos \delta$ supplied from the dive angle function generator 20 by the conductor 86 through the contacts 88 of initiating switch 74. The computer develops an output signal voltage $V_T$, corresponding to the horizontal component of aircraft velocity relative to the target, by taking the first time derivative of the distance signal $R_o \cos \delta$. This voltage is supplied by conductor 66 to the wind computer. After the initiating point P and the actuation of the switch 74, the input to the present position computer includes the horizontal component of aircraft velocity relative to the air mass from the dive angle function generator on conductor 90 through switch contacts 88 and the velocity of the air mass relative to the target $V_{mT}$ from the wind computer on conductor 84 through switch contacts 92. After the actuation of the initiating switch 74, the computer solves for the distance from the initiating point P from the relation $$W = \int V_a \cos - V_{mT}) dt = \int V_T dt \qquad (34)$$

The instantaneous distance to target is derived from $$D_p - W = D_p - V_T dt \qquad (35)$$

as an output signal voltage on the conductor 96. A selector switch 97 is adapted to connect the conductor 96 to the conductor 99 and thence to the release computer 28. Alternatively, the distance to target signal may be derived from the radar 16 through conductor 87 and switch 97 when operating conditions permit. In either case the applied distance signal voltage $$D_O = R_o \cos \delta = D_p - \int V_T dt \qquad (36)$$

corresponds to the remaining term of the release Equation 2.

The release computer 28 is adapted to develop an output signal voltage in response to a predetermined resultant value of input voltage. It suitably comprises a conventional summing amplifier and phase sensitive amplifier to provide an output upon the occurrence of a null summation of input signal voltage. The signal voltages, corresponding to the terms of the general release equation $$D_p - W - R_h = 0 \qquad (2)$$

are supplied to the release computer and when the equation is satisfied an output bomb release signal voltage is developed on conductor 98 and applied to the escape time interlock 30.

When the time of fall of the bomb is less than the escape time $T_e$, the interlock 30 operates to interrupt the bomb release signal circuit. For this purpose, the escape time interlock receives as input signals, the signal voltage T from the true time servo on conductor 100 and the predetermined value of the escape time, $T_e$. The latter signal is provided by the manually adjustable control device designated $T_e$. The escape time interlock 30 continuously compares the value of the time T with the escape time $T_e$ and responds according to the condition:

$$T - T_e \geq 0 \qquad (37)$$

When the time of fall is greater than the escape time then the interlock 30 transmits the bomb release signal which is applied by the conductor 102 to the bomb release mechanism 32 to effect bomb release. The bomb rerelease computer system thus far described, representing the mechanization of the general bomb release equation, is effective to cause automatic bomb release at an appropriate point in the pull-up path of the bomber aircraft to impart a trajectory to the bomb which will intersect the selected target.

In accordance with this invention, the bomb release computer system is provided with the solution possible computer which represents the mechanization of the previously derived solution possible equation. The solution possible computer 36 is adapted to develop an output signal when the summation of the predicted pull-up distance and horizontal trajectory is equal to or greater than the instantaneous distance from the aircraft to the target. Accordingly, the solution possible computer receives trajectory prediction signal quantities through the conductor group or input channel 104 and receives pull-up prediction signal quantities through the conductor group or input channel 106. The distance to target signal quantity is supplied through conductor or input channel 108. When the conditions are such that the solution possible equation is satisfied the computer 36 develops an actuating signal which is applied by the conductor 120 to the solution possible indicator 38. The indicator 38 apprises the pilot of the occurrence of the first point on the bombing run at which a pull-up maneuver may be initiated to obtain a solution to the bombing problem.

In Figure 4 the exemplary embodiment of the solution possible computer is illustrated in greater detail. The description will be facilitated by considering the development of the pull-up and trajectory prediction signal quantities separately. In general, the channel for developing the pull-up prediction signal quantities includes, in addition to the data sensing instruments, the dive angle servo 18 and the dive angle function generator 20. A summing circuit or amplifier 150 is provided for combining the signal quantities and the output is supplied to a multiplication circuit or potentiometer 184. The pull-up prediction signal is applied through conductor 190 to the summing circuit or amplifier 180.

The dive angle servo 18, which may be of conventional design, comprises a summing and servo amplifier 122 which energizes a reversible servomotor 124 in accordance with the algebraic sum of the pitch signal voltage $p$ and the attack angle signal voltage $\alpha$ to angularly position the servo output shaft in accordance with the instantaneous dive angle of the aircraft. A follow-up potentiometer 128 is excited by conductors 130 and 132 from a reference voltage source $E_1$, and includes a movable contact 134 which is positioned by the servomotor shaft 126. A follow-up signal voltage proportional to the angular displacement of the servomotor shaft 126 is developed on the contact 134 and conductor 136. Thus the servomotor 124, energized in accordance with the disagreement of the voltage corresponding to actual dive angle and the voltage corresponding to the position of shaft 126, operates to reduce the resultant input signal to a null value. The output shaft 126 of the dive angle servo therefore assumes an angular position which corresponds with the instantaneous value of the dive angle of the aircraft. The dive angle servo shaft is mechanically interconnected with the input shaft 140 of the dive angle function generator 20 which is thereby displaced angularly in accordnace with the dive angle of the aircraft.

The dive angle function generator 20 includes a linear potentiometer 142 excited from the wind computer 24 through the conductor 144 in accordance with a voltage corresponding to the product $V_aV_{mT}$ which of itself has no physical significance. The potentiometer 142 is angularly positioned on shaft 140 so that its point of reference potential 143 is displaced from the corresponding point 129 on the follow-up potentiometer by an angle equal to the predetermined release angle $\delta_Q$. The potentiometer 142 is provided with a movable contact 146 which is positioned by the shaft 140 in accordance with the dive angle of the aircraft and, accordingly, a voltage is developed on the movable contact 146 which corresponds to the product of the exciting voltage and the angular position of the movable contact. This voltage $V_aV_{mT}(\delta_O+\delta_Q)$ is applied by the conductor 148 to the summing amplifier 150.

The dive angle function generator 20 includes velocity signal resolver 152 for developing the desired components of aircraft velocity relative to the air mass. The resolver has a rotor winding 154 which is excited by the signal voltage $V_a$ from conductor 58 and which is rotatably positioned by the shaft 140 in accordance with the instantaneous dive angle. The resolver includes a cosine function stator winding 156 which develops a signal voltage on the conductor 158 corresponding to the product of airspeed $V_a$ and the cosine of the dive angle. This signal voltage is supplied to the wind computer 24 which will be described in greater detail presently.

An additional velocity signal resolver 160 is adapted to develop desired components of the square of aircraft velocity relative to the target. It is provided with a rotor winding 162 excited in accordance with the signal voltage $V_a^2$ from conductor 59 and rotatably positioned by the shaft 140 in accordnace with the dive angle. The resolver 160 is provided with a cosine function stator winding 164 which develops an output signal voltage on conductor 166 proportional to the product of $V_a^2$ and the cosine of the dive angle. The resolver 160 also has a sine function stator winding 168 which develops an output signal voltage on conductor 170 corresponding to the product of $V_a^2$ and the sine of the dive angle. The signal voltages on conductors 166 and 170 are applied to the summing amplifier 150. A range signal resolver 172 in the dive angle function generator 20 is provided with a rotor winding 174 which is excited from conductor 54 in accordance with the slant range signal voltage $R_O$. The resolver 172 includes a cosine function stator winding 176 which develops an output signal voltage corresponding to the product of the slant range and the cosine of the dive angle. This signal voltage is applied by the conductor 87 to the selector switch 97 and thus through conductor 108 to the summing amplifier 180.

The summing amplifier 150 operates in response to plural input signal voltages to develop an output signal voltage which is proportional to the algebraic sum of the input voltages. In addition to the individual input signal voltages $V_aV_{mT}(\delta_O+30°)$, $V_a^2 \sin \delta_O$, and $V_a^2 \cos \delta_O$ from the dive angle function generator the amplifier 150 receives the signal voltage $V_a^2$. The summation of these signal voltages is developed as an output signal voltage on conductor 182 and applied to the potentiometer 184 for multiplication by the reciprocal of the acceleration A which will be incurred in the pull-up maneuver. The potentiometer 184 includes a movable contact 186 which may be adjustably positioned by the manually adjustable control device 188. The movable contact 186 is positioned in accordance with the reciprocal of the maximum value of acceleration A. The pull-up prediction signal voltage corresponding to the term $$\frac{1}{A}[V_a^2 \sin \delta_O - K_1 V_a^2 \cos \delta_O + (0.866 K_1 - 0.5) V_a^2 - K_0 V_a V_{mT}(\delta_O + 30°)]$$
(38)

of the solution possible Equation 29 is developed on the movable contact 186 and applied by conductor 190 to the input of the summing amplifier 180.

In general, the channel for developing the trajectory prediction quantities includes the wind computer 24 in addition to the data sensing instruments. The wind computer 24 includes a summing and servo amplifier 192 which energizes a reversible servomotor 194 in accordance with the algebraic sum of the velocity relative to target signal voltage, $V_T$, and the velocity relative to air mass signal voltage, $V_a \cos \delta$ in order to angularly displace a servo output shaft 196 in accordance with the instantaneous value of range wind or velocity of the air mass relative to the target. The wind computer includes a follow-up potentiometer 198 which is excited across conductors 200 and 202 by a reference voltage $E_2$. The potentiometer 198 includes a movable contact 204 which is positioned by the servo shaft 196 and develops a follow-up signal voltage which is applied by the conductor 206 to the input of the amplifier 192. The servomotor thus drives the output shaft to an angular position which develops a null summation of the input voltages and which corresponds to the value of the velocity of the air mass relative to the target.

The wind computer includes a potentiometer 212 which is excited across the conductors 214 and 216 in accordance with the aircraft velocity relative to the air mass. The potentiometer 212 includes a movable contact 218 which is positioned in accordance with the value of the range wind by the servo shaft 196. Accordingly, the movable contact derives a voltage proportional to the product of the air mass velocity relative to the target and the aircraft velocity relative to the air mass which is applied by conductor 144 to excite the potentiometer 142 in the dive angle function generator 20, as described previously.

The wind computer 24 also includes a potentiometer 220 which receives an excitation voltage through conductors 222 and 224 from the escape time potentiometer network designated generally at 226. The escape time network 226 includes a pair of serially connected potentiometers 228 and 230 which are excited by the reference voltage source $E_2$ from conductors 200 and 202 and which have the common junction connected to a point of reference potential 232. The potentiometers 228 and 230 include movable contacts 234 and 236, respectively, which are adjustably positioned by a common shaft 238 provided with a manual control device 240. The device 240 is positioned in accordance with a predetermined value of escape time $T_e$ and accordingly the contacts 234 and 236 develop signal voltages $+T_e$ and $-T_e$ of opposite phase and of equal amplitude proportional to the escape time. These signal voltages are applied to the potentiometer 220 through the conductors 222 and 224. The potentiometer 220 includes a movable contact 242 which is adjustably positioned by the servo shaft 196 in accordance with the value of air mass velocity relative to the target. Therefore, an output signal voltage proportional to the product of the escape time and air mass velocity relative to the target is developed on the movable contact 242 and applied by conductor 244 to the input of the summing amplifier 180.

The detonation altitude signal voltage $H_D$ is developed by a potentiometer 246 which is excited from conductor 200 by the reference voltage source $E_2$. The potentiometer 246 includes a movable contact 248 which is adjustably positioned by a manual control device 250. With the device 250 positioned in accordance with the desired detonation altitude the signal voltage $H_D$ is developed on the movable contact 248 and is supplied by the conductor 252 to the summing amplifier 180.

The remainder of the trajectory prediction signal quantities may be developed suitably by the data sensing instruments and applied directly to the summing amplifier 180. The aircraft velocity relative to air mass signal voltages $V_a$ and $V_a^2$ on conductors 58 and 59, and the aircraft altitude above target signal voltage $H_a$ on conductor 104 are developed by the air data computer. The trajectory signal voltages corresponding to the terms $$-K_1H_a + K_1H_D - K_2V_a^2 - K_3V_a - K_4 - K_5T_eV_{mT} \quad (39)$$

of the solution possible Equation 29 are therefore applied to the summing amplifier 180.

The signal voltage corresponding to the remaining term of the solution possible equation, the distance to target $D_0$, is suitably supplied from the radar system 16, as previously described, or alternatively from the present position computer 26. The signal voltage $R_0$, modified by the range signal resolver, to derive the horizontal distance to target $$D_0 = R_0 \cos \delta \quad (40)$$

is supplied by conductor 87 to the selector switch 97. The distance to target $$D_0 = D_p - \int V_T dt \quad (41)$$

is also supplied by the conductor 96 to the switch 97. Either distance signal may be selected by switch 97 in accordance with operating conditions and applied to computer 36 by conductor 108.

The summing amplifier 180 therefore receives signal voltages corresponding to the pull-up prediction signal quantity, the trajectory prediction signal quantity and the range to target signal quantity. The summing amplifier is effective to combine the input signal voltages and to develop an output signal voltage on conductor 181 proportional to the algebraic sum of the input voltages in accordance with the solution possible equation. This output voltage is applied to the phase sensitive amplifier 254.

The phase sensitive amplifier 254 may be of conventional design and is adapted in response to an input signal voltage of either null value or of a predetermined reference phase to develop an actuating signal voltage on the conductor 256. Therefore, when the sum of the pull-up prediction signal quantity and the distance to target signal quantity is equal to or greater than the trajectory prediction signal quantity, as defined by the solution possible equation, the input signal voltage on conductor 181 to the phase sensitive amplifier will be of the reference phase and an actuating signal voltage will be applied by conductor 256 to the relay 258. The relay 258 is adapted to cause energization of the solution possible indicator 38.

The solution possible indicator 38 is adapted in response to an actuating signal voltage to apprise the pilot that the pull-up maneuver may be initiated to obtain a solution to the bombing problem. The indicator suitably comprises a signal lamp 266 serially connected with a voltage source 264 and normally open switch contacts 260. The switch contacts 260 are actuated to the closed position by the relay 258 upon energization thereof by the phase sensitive amplifier 254. Accordingly, the solution possible signal is energized upon the first occurrence of the conditions which satisfy the solution possible equation.

In operation of the inventive bomb release and solution possible computer system, certain of the system parameters are preferably established in pre-flight procedure in accordance with known or predetermined values. The value of the altitude of the selected target above sea level is established in the air data computer 12 by adjustment of the manual control device $H_T$. The selected value of detonation altitude $H_D$ is established in both the true time servo 22 and the solution possible computer 36 by adjustment of the control devices $H_D$. The value of escape time which is determined in accordance with aircraft performance and bomb yield is set in the escape time interlock 30 by adjustment of the control knob $T_e$. Additionally, the maximum value of acceleration which the pilot intends to pull in the pull-up maneuver is set by adjustment of the manual control device 188. The selection of distance measuring equipment, either radar 16 or the present position computer 26, may be effected before or during flight by operation of switch 97.

With the aircraft in flight, the bombing run may be initiated by establishing the dive approach course toward the selected target. During this initiation or acquisition phase of the run, the pilot commences tracking of the target with the aid of the sight 10. The air data computer 12 supplies attack angle information to the sight 10 and to the radar 16 to permit accurate tracking. The radar 16, when operative, continuously derives the slant range signal voltage and supplies it to the dive angle function generator. The dive angle servo 18 receives attack angle information from the air data computer 12 and pitch angle information from the vertical gyro 14 and continuously maintains the input shaft to the dive angle function generator in an angular position corresponding to the instantaneous value of the dive angle of the aircraft.

The true time servo 22 receives data signals from the air data computer 12 and selected dive angle and velocity functions from the dive angle function generator 20 and continuously computes the horizontal trajectory of the bomb in air mass coordinates. The true time servo also continuously computes the true time of fall for the bomb.

The wind computer 24 is supplied with velocity information relative to the target and relative to the air mass to derive a signal corresponding to the velocity of the air mass relative to the target. This latter signal is combined in the wind computer with the true time of fall information to develop a signal corresponding to the component of horizontal trajectory imparted to the bomb by the movement of the air mass. The distance from the aircraft to the target is continuously developed in the present position computer 26 in response to the horizontal component of the slant range, supplied from the dive angle function generator 20.

When the tracking of the target has become satisfactory in the approach course the pilot manually actuates the initiating switch 74. This is effective to interrupt the input information to the wind computer and accordingly the value of the air mass velocity relative to the target is memorized by the computer at the initiating point. Actuation of the initiating switch 74 also interrupts the range to target information supplied to the present position computer. This is effective to cause the computer to memorize the distance from the initiating point to the target and to change the input information to velocity of the air mass relative to the target and velocity of the aircraft relative to the air mass. Accordingly, the present position computer develops a signal corresponding to the velocity of the aircraft relative to the target which is integrated continuously with respect to time and subtracted from the distance of the initiating point from the target.

Therefore, after the occurrence of the initiating point, information corresponding to the terms of the general bomb release equation is developed and applied to the release computer 28. This information includes the horizontal component of the bomb trajectory in air mass coordinates from the true time servo 22, the horizontal component of the bomb trajectory imparted by the motion of the air mass from the wind computer 24, and the horizontal distance from the aircraft to the target supplied from either the present position computer 26 or radar 16 in accordance with the condition of selector switch 97. This information, as previously described, is combined by release computer 28 in accordance with the release equation.

In order to ensure that a solution to the bombing problem will be obtained the pilot must not initiate the pull-up maneuver until a solution possible signal is obtained during the approach course. As previously described, the development of the solution possible signal is dependent upon the summation of the pull-up prediction quantity and the distance to target quantity being equal to or greater than the trajectory prediction quantity as defined by the solution possible equation. The pull-up prediction signal quantities corresponding respectively to the terms $$-V_a V_{mT}(\delta_O + 30°) + V_a^2 \sin \delta_O - V_a^2 \cos \delta_O + V_a^2 \quad (42)$$

are developed by the potentiometer 142, the sine and cosine windings 168 and 164 in the velocity signal resolver 160 of the dive angle function generator 20, and the air data computer 12. These signal voltages are algebraically combined in the summing amplifier 150 and the resulting signal voltage is multiplied by the reciprocal of the maximum value of acceleration to be incurred in the pull-up maneuver by the potentiometer 184. The resulting signal voltage corresponding to the expression $$\frac{1}{A}[V_a^2 \sin \delta_O - K_1 V_a^2 \cos \delta_O + (0.866 K_1$$
$$-0.5)V_a^2 - K_0 V_a V_{mT}(\delta_O + 30°)] \quad (43)$$

which represents the pull-up prediction signal quantity is applied to the summing amplifier 180.

The trajectory prediction signal quantities corresponding to the terms of the trajectory prediction expression $$-K_1 H_a - K_2 V_a^2 - K_3 V_a - K_4 - K_5 T_e V_{mT} \quad (44)$$

are developed as previously described in the wind computer 24, the manually adjusted potentiometer 246, and the air data computer 12.

The distance to target signal quantity $D_0$ is continuously supplied by either the present position computer 26 or the dive angle function generator 20 in accordance with the condition of selector switch 97 and is applied to the summing amplifier 180.

When the solution possible equation is satisfied by the signal quantities, the phase sensitive amplifier 254 is effective to energize the solution possible indicator 38. Upon this occurrence the pilot may initiate the pull-up maneuver and be assured of a solution providing that the pull-up maneuver does not exceed the specified maximum value of acceleration. If the acceleration of the pull-up maneuver is maintained at the maximum permissible value, satisfaction of the bomb release equation will occur during the pull-up maneuver at a release point which coincides with the predicted release point. If the pull-up maneuver is executed at an acceleration less than the specified maximum value, the actual release point will occur at a point closer to the target than the predicted release point but a satisfactory solution will obtain because the release angle will impart less than maximum toss to the bomb to cause the trajectory to intersect the selected target.

It will now be appreciated that the inventive bomb release and solution possible computer is adapted for various types of toss bombing operations. It is admirably suited for the dive mode of toss bombing just described and may be used without modification for the level mode of toss bombing. Although the description of the invention has been given with respect to a particular embodiment, it is not to be construed in a limiting sense. Many variations and modifications within the spirit and scope of the invention will now occur to those skilled in the art. For a definition of the invention, reference is made to the appended claims.

We claim:

1. A toss bombing computer system comprising a release computer responsive to a first predetermined signal quantity for causing bomb release, means responsive to functionally related variable data quantities for applying said first predetermined signal quantity to the release computer when the aircraft path is tangent to a bomb trajectory intersecting a selected target, a solution possible computer responsive to a second predetermined signal quantity for signifying occurrence of the first point on the aircraft bombing path that a given pull up maneuver may be initiated to obtain the first predetermined signal quantity in the release computer, and means responsive to functionally related variable data quantities and pre-assigned data quantities corresponding to selected parameters of the given maneuver for developing the second predetermined signal quantity in the solution possible computer.

2. A toss bombing system for ascertaining the first point on an aircraft bombing path that a pull up maneuver may be initiated to obtain a solution to the bombing problem comprising a bomb release computer responsive to a predetermined input signal to effect release of the bomb at a point where the aircraft path is tangent to a bomb trajectory intersecting a selected target, means for applying to said release computer a predetermined functional relation of selected data signals corresponding to the existing value of the parameters of the bombing problem, a solution possible computer responsive to a predetermined input signal to signify the occurrence of said first point on the bombing path, means for modifying said predetermined functional relation of data signals in accordance with selected parameters of a predetermined pull up maneuver so that the value of the modified functional relation at said first point corresponds to the value of the functional relation at the release point, and means for applying the modified functional relation of data signals to the solution possible computer.

3. A toss bombing system for ascertaining the first point on an aircraft bombing path that a pull up maneuver may be initiated to obtain a solution to the bombing problem comprising means for developing a range signal quantity corresponding to the horizontal distance from the aircraft to the target, means for developing a trajectory signal quantity corresponding to the horizontal distance a bomb will travel from any bomb release point to a given altitude, a bomb release computer receiving said signal quantities and developing a bomb release signal upon the occurrence of equal values thereof, means for developing pull up distance prediction signal quantity for modifying the range signal quantity and corresponding to the horizontal distance the aircraft will travel in a predetermined maneuver to a predetermined release attitude defining a predicted release point, means for developing trajectory prediction signal quantity corresponding to the horizontal distance the bomb will travel from the predicted release point to a given altitude, a solution possible computer receiving the range, pull up distance, and the predicted trajectory signal quantities for developing a solution possible signal when the sum of the range and the predicted pull up quantities is equal to or less than the trajectory prediction signal quantity.

4. A toss bombing computer system comprising a release computer responsive to a first predetermined signal voltage for causing bomb release, means responsive to functionally related variable data quantities for applying said first predetermined signal voltage to the release computer when the aircraft path is tangent to a bomb trajectory intersecting a selected target, a solution possible computer responsive to a second predetermined signal voltage for signifying occurrence of the first point on the aircraft bombing path that a given pull up maneuver may be initiated to obtain the first predetermined signal voltage in the release computer, means for developing a first signal voltage component corresponding to the horizontal distance required to reach a predicted release point at a predetermined release attitude attained without exceeding a predetermined acceleration, means for developing a second signal voltage component corresponding to the horizontal distance the bomb will travel from the predicted release point in reaching a predetermined altitude, means for developing a third signal voltage component corresponding to the horizontal distance from the aircraft to the target, and means associated with said solution possible computer receiving said signal voltage components and developing the said second predetermined signal voltage when the sum of the first and second components is equal to or greater than the third component.

5. A toss bombing computer system comprising a release computer responsive to a first predetermined signal voltage for causing bomb release, means responsive to functionally related variable data quantities for applying said first predetermined signal voltage to the release computer when the aircraft path is tangent to a bomb trajectory intersecting a selected target, a solution possible computer responsive to a second predetermined signal voltage for signifying occurrence of the first point on the aircraft bombing path that a given pull up maneuver may be initiated to obtain the first predetermined signal voltage in the release computer, means for developing a first signal voltage component corresponding to the horizontal distance from the aircraft to a predicted release point which varies directly with the product of the square of existing aircraft velocity and the difference in the sine functions of the existing dive angle and a predetermined release point dive angle and inversely with a predetermined acceleration, means for developing a second signal voltage component corresponding to the horizontal distance the bomb will travel from the predicted release point to a predetermined altitude, means for developing a third signal voltage component corresponding to the horizontal distance from the aircraft to the target, and means associated with said solution possible computer receiving said signal voltage components and developing said second predetermining signal voltage when the sum of the first and second components is equal to or greater than the third component.

6. In combination with an aircraft bombing computer system of the type adapted to effect release of a bomb from an aircraft at a point where the aircraft path is tangent to a bomb trajectory intesecting a selected target, a solution possible computer comprising means for developing a signal voltage component corresponding to the horizontal distance from the aircraft present position to the target, means for developing a signal voltage component corresponding to the predicted horizontal distance the aircraft will travel in a predetermined maneuver from the present position to a predetermined aircraft attitude for bomb release, means for developing a signal voltage component corresponding to the predicted horizontal distance the bomb will travel in reaching a predetermined altitude, and means receiving said components and signifying that a solution to the bombing poblem will be realized by said computer system if said predetermined aircraft maneuver is initiated at the present position.

7. In combination with an aircraft bombing computer system of the type adatped to effect release of a bomb from an aircraft at a point where the aircraft path is tangent to a bomb trajectory intersecting a selected target, a solution possible computer comprising means for developing a first signal voltage component corresponding to the horizontal distance from the aircraft present position to the target, means for developing a second signal voltage component which corresponds to the predicted horizontal distance the aircraft will travel in a pull up maneuver and which is a function of present aircraft velocity and dive angle and predetermined aircraft acceleration and release point dive angle, means for developing a signal voltage component corresponding to the horizontal distance the bomb will travel from the release point in reaching a predetermined altitude, and means receiving said components for providing an output volttage when the sum of the signal voltages corresponding to the predicted distances is equal to or greater than the voltage component corresponding to the distance from the aircraft present position to the target, signifying that a solution to the bombing problem will be realized by said computer system if said predetermined aircraft maneuver is initiated at the present position.

8. In combination with an aircraft bombing computer system of the type adapted to effect release of a bomb from an aircraft at a point where the aircraft path is tangent to a bomb trajectory intersecting a selected target, a solution possible computer comprising means for developing a first signal voltage component corresponding to the horizontal distance from the aircraft present position to the target, means for developing a second signal voltage component which corresponds to the predicted horizontal distance the aircraft will travel in a pull up maneuver and which varies with the summation of the horizontal components, at the present dive angle and at a predetermined release point dive angle, of the pull up radius of curvature for a given acceleration and present aircraft velocity, means for developing a signal voltage component corresponding to the summation of the maximum horizontal trajectory of the bomb for the present position and the change of the horizontal trajectory due to the change of altitude from present position to release point, and means receiving said components for providing an output voltage when the sum of the signal voltages corresponding to the predicted distances is equal to or greater than the voltage component corresponding to the distance from the aircraft present position to the target, signifying that a solution to the bombing problem will be realized by said computer system if said predetermined aircraft maneuver is initiated at the present position.

9. In combination with an aircraft bombing computer system of the type adapted to effect release of a bomb from an aircraft at a point where the aircraft path is tangent to a bomb trajectory intersecting a selected target, a solution possible computer comprising means for developing a first signal voltage component corresponding to the horizontal distance from the aircraft present position to the target, means for developing a second signal voltage component which corresponds to the predicted horizontal distance the aircraft will travel in a predetermined pull up maneuver from the present position to a predetermined aircraft attitude for bomb release, means for developing a signal voltage component corresponding to the summation of the maximum horizontal trajectory of the bomb for the present position and the change of the horizontal trajectory due to the change of altitude from the present position to the release point, and means receiving said components for providing an output voltage when the sum of the signal voltages corresponding to the predicted distances is equal to or greater than the voltage component corresponding to the distance from the aircraft present position to the target, signifying that a solution to the bombing problem will be realized by said computer system if said predetermined aircraft maneuver is initiated at the present position.

10. A toss bombing system for ascertaining the first point on an aircraft bombing path that a pull-up maneuver may be initiated to obtain a solution to the bombing problem for a selected target comprising a distance measuring computer for developing a range signal voltage corresponding to the horizontal distance from the aircraft to the target, a pull-up prediction computer including a dive angle servo having an output shaft angularly displaced in accordance with the existing dive angle of the aircraft, a resolver connected with said shaft and including a sine function winding and an excitation winding, an air data computer for developing voltages corresponding to predetermined functions of aircraft altitude and velocity, a velocity squared circuit derived from the air data computer and connected to the excitation winding of said resolver, means for developing a voltage corresponding to the product of the velocity squared and the sine function of a predetermined bomb release dive angle, a summing circuit connected with said sine function winding and the last named means for deriving a resultant voltage, a multiplication circuit receiving the resultant voltage from the summing circuit and including means for introducing a factor corresponding to the reciprocal of the maximum value of acceleration to be incurred in the pull-up maneuver for developing a signal voltage corresponding to the horizontal distance required for the pull-up maneuver, a trajectory prediction computer including an altitude voltage circuit, a velocity voltage circuit, and a velocity squared voltage circuit derived from said air data computer, a solution possible computer including a summing circuit connected with the distance measuring computer, the pull-up prediction computer, and the trajectory prediction computer for developing an actuating voltage upon the occurrence of a null summation of said signal voltages, and an indicator connected with the solution possible computer for signaling said occurrence.

11. The combination defined by claim 10 wherein said pull-up prediction computer also includes a range wind servo having an output shaft positioned in accordance with the magnitude of range wind, a potentiometer connected with the aircraft velocity squared circuit of the air data computer for excitation thereby and having a movable contact positioned by the range wind output shaft, a potentiometer connected with said movable contact for excitation thereby and having a movable contact positioned by the dive angle servo shaft, said last mentioned contact being connected with the summing circuit of the pull-up prediction computer to account for the relative motion of the air mass and target in deriving the pull-up prediction signal voltage.

12. The combination defined by claim 10 wherein said pull-up prediction computer also includes a resolver connected with the dive angle servo shaft and having an excitation winding connected with the velocity squared circuit of the air data computer and having a cosine function winding, said cosine function winding and said velocity squared circuit being connected with the summing circuit of the pull-up prediction computer to account for the change of aircraft altitude from pull-up to release.

13. The combination defined by claim 11 wherein said trajectory prediction computer also includes a time of fall circuit for developing a voltage corresponding to the predicted time required for the bomb to fall from release to detonation, a potentiometer connected with the time of fall circuit for excitation thereby and having a movable contact positioned by said range wind servo, and connected with the summing circuit of the solution possible computer to account for the horizontal distance traversed by the bomb due to the relative motion of the air mass and target.

No references cited.